United States Patent [19]

Kennon

[11] 4,429,366
[45] Jan. 31, 1984

[54] MICROPROCESSOR-BASED LOAD MANAGEMENT TERMINAL WITH RESET

[75] Inventor: Jerry M. Kennon, Raleigh, N.C.

[73] Assignee: Westinghouse Electric Corp., Pittsburgh, Pa.

[21] Appl. No.: 252,683

[22] Filed: Apr. 9, 1981

[51] Int. Cl.³ .................... G01R 21/00; G06F 11/00
[52] U.S. Cl. ................................... 364/482; 364/900
[58] Field of Search ... 364/200 MS File, 900 MS File, 364/493, 551; 307/38, 39, 40; 235/92

[56] References Cited

U.S. PATENT DOCUMENTS

| | | | |
|---|---|---|---|
| 3,964,023 | 6/1976 | Fauchez | 340/147 |
| 4,084,262 | 4/1978 | Lloyd et al. | 364/900 |
| 4,100,426 | 7/1978 | Baranowski et al. | 307/41 |
| 4,125,782 | 11/1978 | Pollnow, Jr. | 364/900 |
| 4,167,786 | 9/1979 | Miller et al. | 364/493 |
| 4,175,238 | 11/1979 | Breimesser et al. | 307/40 |
| 4,192,130 | 3/1980 | Takeuchi | 364/569 |
| 4,213,182 | 7/1980 | Eichelberger et al. | 364/493 |
| 4,218,737 | 8/1980 | Buscher et al. | 364/483 |
| 4,234,920 | 11/1980 | Van Ness et al. | 364/200 |
| 4,254,472 | 3/1981 | Juengel et al. | 364/900 |
| 4,348,743 | 9/1982 | Dozier | 235/92 |

Primary Examiner—Gareth D. Shaw
Assistant Examiner—Daniel K. Dorsey
Attorney, Agent, or Firm—D. R. Lackey

[57] ABSTRACT

A load management terminal is utilized as an end device in a utility's distribution network communication system. The distribution network carries electrical power as well as communication signals. The load management terminal is comprised of a power line coupling unit for connecting the load management terminal to the power distribution network. A signal receiver and conditioning unit produces a command signal in response to a received communication signal. A solid state memory contains preprogrammed instructions and data. A microprocessor performs load control functions in response to the command signal. The microprocessor additionally produces a diagnostic signal being in a low state in response to one of the preprogrammed instructions and being in a high state in response to another of the preprogrammed instructions. A reset circuit monitors the diagnostic signal and resets the microprocessor in response to irregularities in the diagnostic signal thereby greatly increasing the reliability of the load management terminal.

11 Claims, 6 Drawing Figures

MICROPROCESSOR-BASED LOAD MANAGEMENT TERMINAL WITH RESET

BACKGROUND OF THE INVENTION

1. Field of the Invention

This invention generally relates to remote communication terminals capable of collecting data and performing load management functions.

2. Description of the Prior Art

Several types of distribution network communication systems exist for communicating over the power-line conductors of a utility's power distribution network. The purpose of the communication system is to allow a central control station to communicate with individual or groups of utility customers. Such communications may include instructions for data acquisition or load control. In order to receive and implement these instructions the utility customer location must be equiped with some type of equipment responsive to the received instructions, such as a load management terminal.

A typical load management terminal is capable of receiving communication signals, determining which of the received signals were addressed to it, and taking appropriate action in response. Appropriate action may be to interrogate a time of day meter, shed specific loads or update a local clock. The load management terminal is also capable of transmitting meter data and other information from the customer location, through the distribution network, back to the electric utility.

In order to perform all of these functions and still be capable of mass production at cost effective prices, load management terminals are typically designed around a microprocessor. The microprocessor can perform a variety of functions such as comparing the address of a received signal to stored addresses, performing an error check on the received signal, etc., while discrete circuits and output devices, under microprocessor control, perform other necessary functions such as receiving or transmitting a communication signal, disconnecting loads, etc. The microprocessor based load management terminal is dependent upon the proper operation of the microprocessor in order to function without problems.

A microprocessor requires a set of commands, or instructions, in order to perform its intended function. It is possible for a microprocessor to become lost and to begin to execute instructions out of sequence, or to execute phantom instructions, as a result of electrical noise, system transients or the like. When the microprocessor becomes lost it must be reset, or directed to a specific instruction within a program, in order to return to a proper state of operation. The present invention is for a load management terminal having improved operating reliability due primarily to a novel reset circuit capable of detecting when the microprocessor is lost and, accordingly, resetting the microprocessor.

SUMMARY OF THE PRESENT INVENTION

The present invention is a microprocessor based load management terminal having improved reliability and performing an additional load control function. The load management terminal is utilized as an end device in a utility's distribution network communication system. The distribution network carries electrical power as well as communication signals. The load management terminal is comprised of a power-line coupling unit for connecting the load management terminal to the power distribution network. A signal receiver and conditioning unit produces a command signal in response to the power-line coupling unit. A solid state memory contains preprogrammed data and instructions. A microprocessor performs load management functions in response to the command signal. The microprocessor additionally produces a diagnostic signal being in a low state in response to one of the instructions and being in a high state in response to another of the instructions.

A reset circuit is comprised of a first timer responsive to the low state of the diagnostic signal and a second timer responsive to the high state of the diagnostic signal. The first and second timers cooperate to monitor the microprocessor and to reset the microprocessor whenever it becomes lost. The reset circuit is considered to be an important feature of the present invention.

DESCRIPTION OF THE PREFERRED EMBODIMENT

Figure 1:
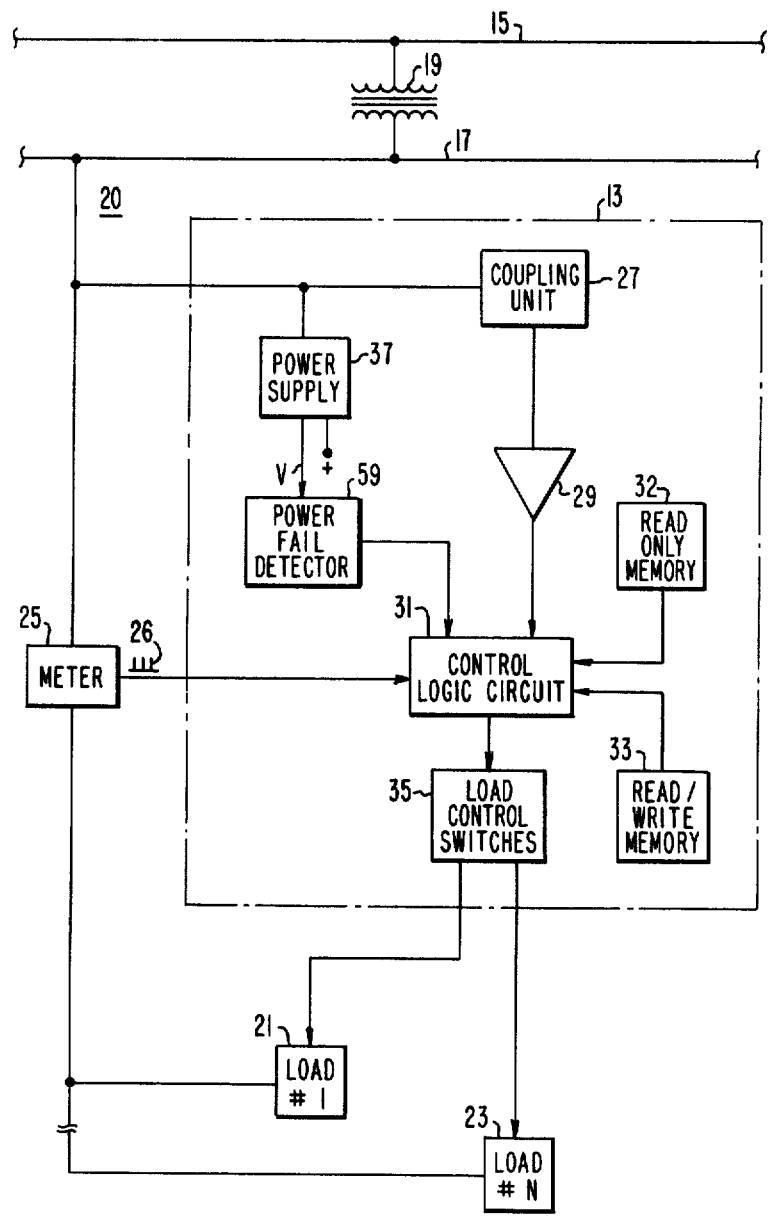
FIG. 1 is a block diagram illustrating a load management terminal constructed according to the teachings of the present invention.

FIG. 1 is a block diagram illustrating a load management terminal (hereinafter LMT) 13 constructed according to the teachings of the present invention. FIG. 1 also illustrates in block diagram form the typical environment in which the LMT 13 is found. A primary feeder 15 of a utility's power distribution network is connected to a conductor 17 through a distribution transformer 19. The conductor 17 is used to deliver electrical power to a plurality of custmer sites, a typical customer site 20 being illustrated in FIG. 1. Electrical power is delivered to a plurality of loads 21 and 23 within the customer site 20. The electrical power is delivered through an electric energy meter 25 of the type having an encoding register and being capable of producing a pulse signal 26 representative of the electric energy consumption. The loads 21 and 23 together with the electric energy meter 25 and the LMT 13 make up the customer site 20.

The LMT 13 is comprised of a power-line coupling unit 27 which connects the LMT to the power distribution system. A signal receiver and conditioner 29 is responsive to the coupling unit 27 to provide command signals in response to received communication signals. The command signals are input to a control logic circuit. The control logic circuit 31 is comprised of several components including a microprocessor and a reset circuit which are described in further detail in conjunction with FIG. 2 hereinbelow.

A read only memory 32 contains programmed information and instructions necessary for the proper operation of the LMT 13. A read/write memory 33 contains meter readings, time of day information, scratch pad calculations and the like. The control logic circuit 31 controls a plurality of load control switches 35. The control logic circuit 31 also receives the pulse signal 26. The control logic circuit 31 provides a plurality of functions such as interrogating the electric energy meter 25 and opening and closing load control switches 35 thereby removing and adding loads to the power distribution network in response to appropriate command signals.

The LMT 13 additionally includes a power supply 37 producing regulated supply voltages for the LMT. One of the supply voltages V is monitored by power fail detector 59. A reset signal produced by the power fail detector 59 is input to the control logic circuit 31. The power fail detector 59 is discussed in further detail in conjunction with FIGS. 2 and 4.

Figure 2:
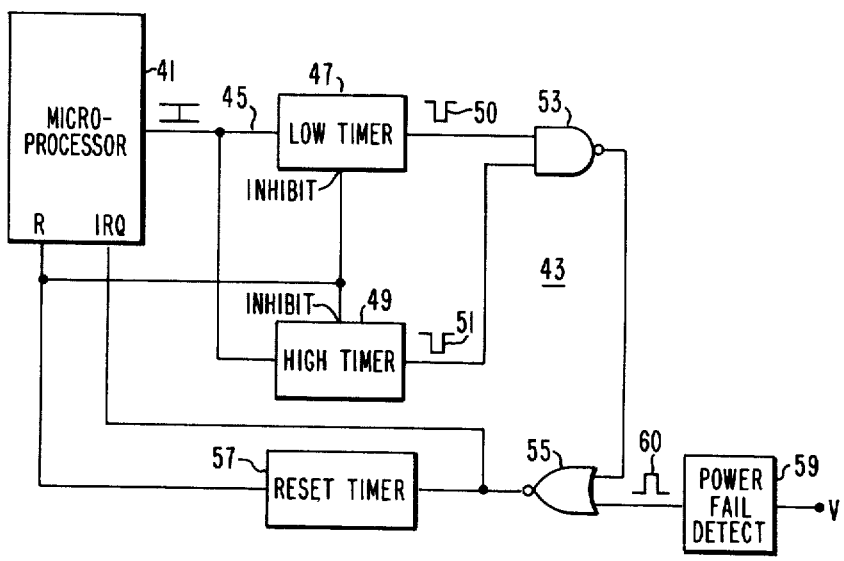
FIG. 2 is a block diagram illustrating a microprocessor and a reset circuit constructed according to the teachings of the present invention.

Turning to FIG. 2 a block diagram illustrating the microprocessor 41 and the reset circuit 43 of the control logic circuit 31 is shown. The microprocessor 41 produces a diagnostic signal 45 in response to preprogrammed instructions. The diagnostic signal 45 is input to both a low timer 47 and a high timer 49. The low timer 47 produces a first reset signal 50 which is input to a NAND gate 53. The high timer 49 produces a second reset signal 51 which is also input to the NAND gate 53. An output signal of the NAND gate 53 is input to a NOR gate 55. An output signal of the NOR gate 55 is input to an interrupt request input terminal IRQ of the microprocessor 41. The output signal of the NOR gate 55 is also input to a reset timer 57. An output signal of the reset timer 57 is input to a reset input terminal R of the microprocessor 41, an inhibit input terminal of the low timer 47 and an inhibit input terminal of the high timer 49. Finally, FIG. 2 illustrates the power fail detector 59 which produces a third reset signal 60 in response to the regulated supply voltage V. The third reset signal 60 is input to the NOR gate 55.

Figure 3:
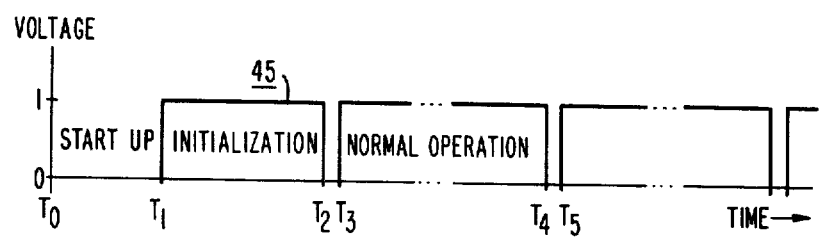
FIG. 3 is a timing diagram illustrating the diagnostic signal.

The operation of the reset circuit 43 shown in FIG. 2 may be more easily understood by referring to FIG. 3 wherein a detailed timing diagram of the diagnostic signal 45 is illustrated. During startup, from time $T_0$ to time $T_1$, the microprocessor 41 inhibits both the low timer 47 and the high timer 49 from operating. At time $T_1$ the microprocessor 41 executes an initialization routine wherein one of the early instructions is to set the diagnostic signal in a high state. One of the last instructions of the initialization routine instructs the microprocessor to set the diagnostic signal to the low state as shown at time $T_2$. From time $T_2$ to time $T_3$ the diagnostic signal is in the low state. At time $T_3$ the normal operating routine begins and the microprocessor is instructed to set the diagnostic signal in the high state. The diagnostic signal remains in the high state until the end of the normal operating routine when it is again set to the low state as shown at time $T_4$. In this manner, a pattern is developed wherein the diagnostic signal 45 spends a predetermined time in the high state and a predetermined time in the low state. By having a very short time period during which the diagnostic signal 45 is in the low state, and by locating this time period between the end and the beginning of the normal operating routine, a very secure method of determining whether the microprocessor 41 properly executes this crucial "turn-around", and hence the proper operation of the microprocessor is established. Those skilled in the art will recognize that such a pattern may be established using times other than at the beginning and at the end of the normal operating routine.

The low timer 47 is responsive to the time during which the diagnostic signal 45 is in the low state. As shown in FIG. 3, the time the diagnostic signal 45 is in the low state should not exceed the time period between time $T_4$ and time $T_5$, for example. If the time during which the diagnostic signal 45 exceeds this predetermined time period the assumption is that the microprocessor 41 is lost and must be reset. The low timer 47 produces the first reset signal 50 in response to this condition.

Similarly, the high timer 49 is responsive to the time during which the diagnostic signal 45 is in the high state. The time during which the diagnostic signal 45 is in the high state should not exceed the time period between time $T_3$ and time $T_4$, for example. If the diagnostic signal 45 remains in the high state beyond this predetermined time period the assumption again is that the microprocessor 41 is lost and must be reset. The high timer 49 produces the second reset signal in response to this condition.

The first and second reset signals 50 and 51, respectively, propagate through the gates 53 and 55 to the interrupt request input terminal IRQ of the microprocessor 41 and the reset timer 57. Upon receipt of one of the reset signals at the interrupt request input terminal IRQ the microprocessor 41 performs an interrupt subroutine for protecting the read/write memory 33. The reset timer 57 delays the reset signals so as to allow enough time for the microprocessor 41 to complete the interrupt subroutine before the microprocessor is reset.

The power failure detector 59 produces the third reset signal 60 whenever the supply voltage V falls below a predetermined voltage level. The third reset signal 60 propagates through the gate 55 to initiate the interrupt subroutine in a similar fashion to the first and second reset signals 50 and 51, respectively. The third reset signal 60 is delayed by the reset timer 57 such that the interrupt subroutine is completed. However, the third reset signal 60 will hold the microprocessor 41 in the reset condition until the supply voltages return to acceptable levels.

Figure 4:
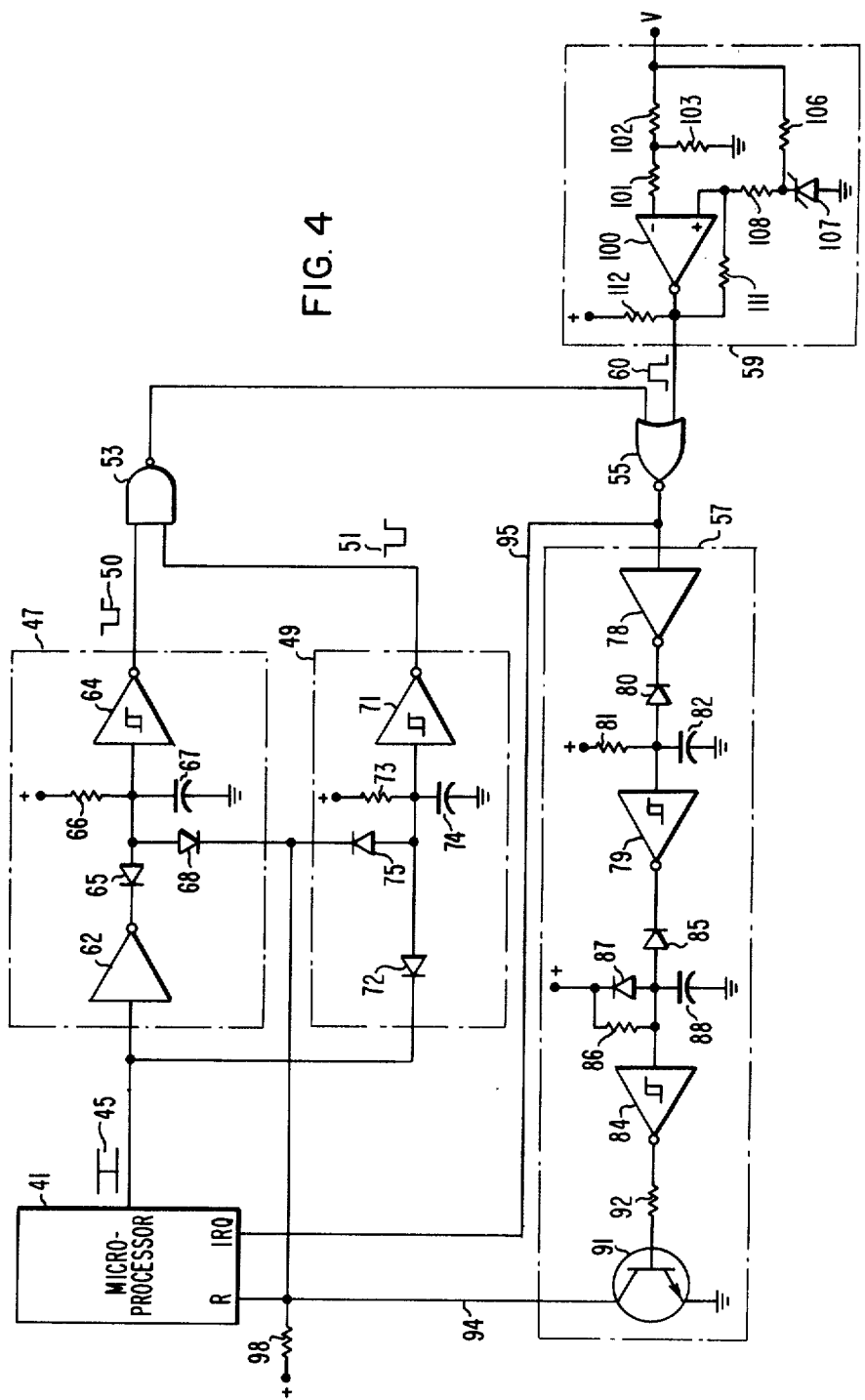
FIG. 4 is an electrical schematic illustrating the circuit details of FIG. 2.

FIG. 4 is an electrical schematic illustrating the circuit details of the components shown in FIG. 2. The microprocessor 41 produces the diagnostic signal 45 which is input to an inverter 62. An output terminal of the inverter 62 is connected to an input terminal of a Schmitt trigger 64 through a diode 65. The input terminal of the Schmitt trigger 64 is connected to a positive voltage source through a resistor 66, to ground through a capacitor 67 and to the reset input terminal R of the microprocessor 41 through a diode 68. The first reset signal 50 is available at an output terminal of the Schmitt trigger 64. The inverter 62 and the Schmitt trigger 64 together with the associated components provide the function of the low timer 47 shown in FIG. 2.

In operation, when the diagnostic signal 45 is in the high state the signal available at the output terminal of the inverter 62 is in a low state. The capacitor 67 is thus normally discharged and the first reset signal is normally in a high state. When the diagnostic signal 45 is in the low state the signal at the output terminal of the inverter 62 is in a high state thus allowing the capacitor 67 to charge. If the diagnostic signal 45 remains in the low state for an abnormally long time, the capacitor 67 will charge to a sufficient value such that the first reset signal 50 will change from a high to a low state. This change in state of the first reset signal 50 will only occur should the diagnostic signal 45 remain in the low state for an inappropriate time period. The value of the capacitor 67 is chosen so as to provide an appropriate limit on the time during which the diagnostic signal 45 is in the low state.

The diagnostic signal 45 is additionally input to an input terminal of a Schmitt trigger 71 through a diode 72. The input terminal of the a Schmitt trigger 71 is additionally connected to a positive voltage source through a resistor 73, to ground through a capacitor 74 and to the reset input terminal R of the microprocessor 41 through a diode 75. The second reset signal 51 is available at an output terminal of the inverter 71. The Schmitt trigger 71 and associated components provide the function of the high timer 49 shown in FIG. 2.

In operation, the capacitor 74 is normally discharged. The second reset signal 51 is normally in a high state in response to the capacitor 74 being discharged. When the diagnostic signal 45 is in the high state the capacitor 74 begins to charge. If the diagnostic signal 45 remains in the high state for an inappropriate period of time, the capacitor 74 will charge to a sufficient voltage level such that the Schmitt trigger 71 will have a high signal input thereto. In response to this condition the second reset signal 51 will change from a high to a low state. The value of the capacitor 74 is chosen so as to provide an appropriate limit on the time during which the diagnostic signal 45 is in the high state.

The reset timer 57 shown in FIG. 2 is comprised of a first inverter 78 having an input terminal responsive to the output terminal of the NOR gate 55. An output terminal of the inverter 78 is connected to an input terminal of a Schmitt trigger 79 through a diode 80. The input terminal of the Schmitt trigger 79 is connected to a positive voltage source through a resistor 81 and is connected to ground through a capacitor 82. An output terminal of the Schmitt trigger 79 is connected to an input terminal of a Schmitt trigger 84 through a diode 85. The input terminal of the Schmitt trigger 84 is connected to ground through a capacitor 88 and is connected to a positive voltage source through the parallel combination of a resistor 86 and a diode 87. An output terminal of the Schmitt trigger 84 is connected to a base terminal of a transistor 91 through a resistor 92. An emitter terminal of the transistor 91 is connected to ground. A collector terminal of the transistor 91 is connected to the reset-input terminal R of the microprocessor 41 through a conductor 94. The reset input terminal R of the microprocessor 41 is additionally connected to a positive voltage source through a resistor 98. The interrupt request input terminal IRQ of the microprocessor 41 is connected to the output terminal of the NOR gate 55 through a conductor 95.

Under normal operating conditions, the voltage on the conductors 94 and 95 is high. When any of the reset signals propagate through the NOR gate 55 the voltage on conductor 95 is immediately pulled low thereby causing the microprocessor 41 to perform the interrupt subroutine. The voltage on the conductor 94 is not pulled low until after a predetermined delay, caused by the reset timer 57, so as to allow the microprocessor 41 to complete the interrupt subroutine before being reset.

The details of the operation of the reset timer 57 are as follows. The signal available at the output terminal of the inverter 78 is normally in a low state such that the capacitor 82 is normally discharged. The signal available at the output terminal of the Schmitt trigger 79 is normally in a high state such that the capacitor 88 is charged. The signal available at the output terminal of the Schmitt trigger 84 is normally in a low state such that the transistor 91 is nonconductive. When the transistor 91 is nonconductive the voltage available through the resistor 98 is directly applied to the reset input terminal R of the microprocessor 41. When a reset signal propagates through the NOR gate 55 and the inverter 78, its propagation through the remainder of the reset timer 57 is delayed while the capacitor 82 charges up. Once the capacitor 82 has charged, the reset signal propagates through the remainder of the reset timer 57 causing the transistor 91 to become conductive. With the transistor 91 conductive the voltage on the conductor 94 is pulled low thereby causing a reset of the microprocessor 41. Thus, the value of the capacitor 82 determines the delay effected by the reset timer 57. Additionally, with the voltage on the conductor 94 pulled low both the low timer 47 and the high timer 49 are inhibited since neither capacitor 67 or 74 can charge.

Another feature of the reset timer is the charging time of the capacitor 88. Although the capacitor 88 provides no delay for the reset signals, it does provide a delay when power is initially turned on. This delay is used to insure that the supply voltages for the LMT are stabilized.

The remaining components to be described in FIG. 4 are those which comprise the power fail detector 59. An unregulated source voltage V is input to an inverting input terminal of an operational amplifier 100 through the series combination of resistor 101 and 102. The junction of resistors 101 and 102 is connected to ground through a resistor 103. The unregulated source voltage V is additionally connected to ground through the series combination of a resistor 106 and a zener diode 107. The junction of the resistor 106 and the zener diode 107 is connected to a non-inverting input terminal of the operational amplifier 100 through a resistor 108. The non-inverting input terminal of the operational amplifier 100 is connected to an output terminal thereof through a resistor 111. The output terminal of the operational amplifier 100 is connected to a positive voltage source through a resistor 112. The third reset signal 60 is available at the output terminal of the operational amplifier 100. The operational amplifier 100 acts as a comparator and causes the third reset signal 60 to change state in response to the supply voltage going out of regulation.

Figure 5:
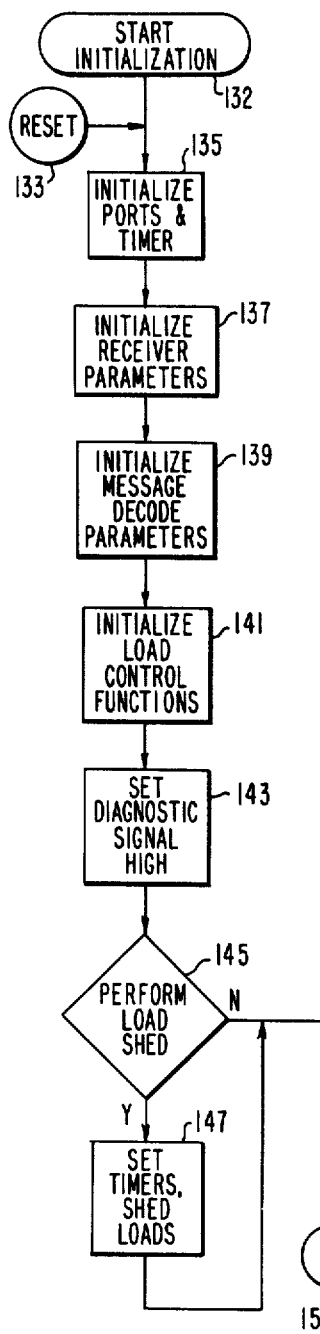
FIG. 5 is a flow chart illustrating the initialization routine of the present invention.
Figure 6:
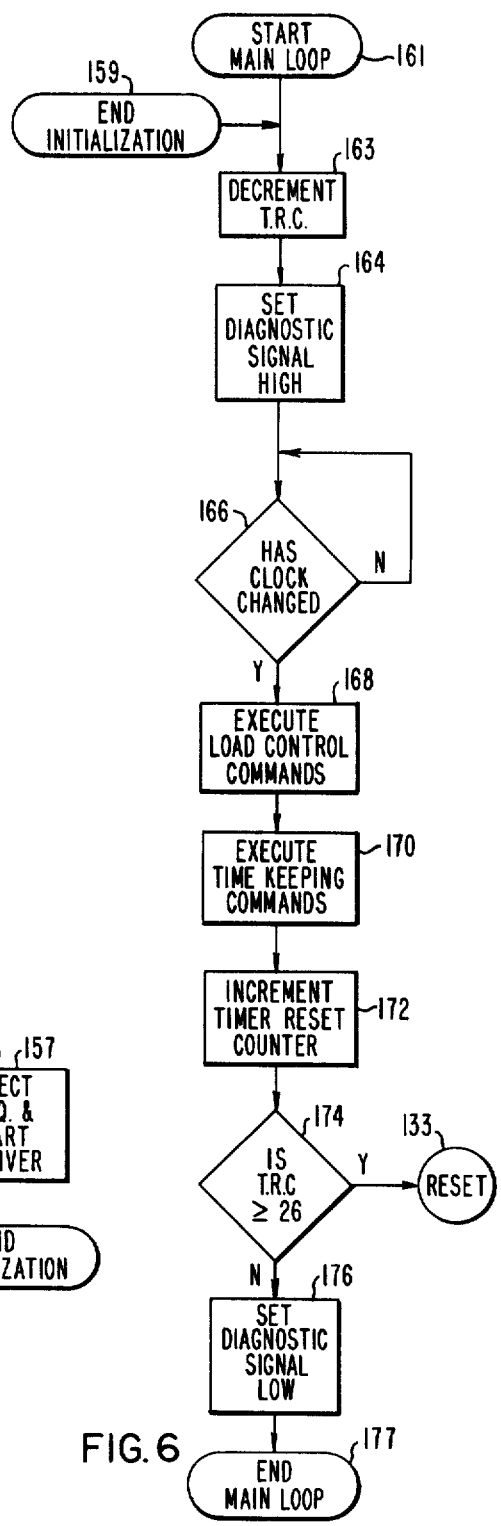
FIG. 6 is a flow chart illustrating the normal operating routine of the present invention.

A certain amount of software is necessary in order for the LMT 13 disclosed herein to benefit from the reset circuit 43. Specifically, the microprocessor 41 must be instructed to set the diagnostic signal 45 in the appropriate state. In FIGS. 5 and 6 software flow charts illustrate how, and where, these specific needs may be implemented within the normal software necessary for the proper operation of the LMT.

Turning first to FIG. 5, an initialization routine is begun at block 132. The initialization routine may alternatively be entered as the result of the microprocessor 41 receiving a reset signal as indicated by balloon 133. The first step of the initialization routine is represented by block 135 wherein the microprocessor ports and the internal microprocessor timer are initialized. At block 137 the parameters of the signal receiver and conditioner 29 are initialized. At blocks 139 and 141 the message decode parameters and the load control functions, respectively, are initialized. At step 143 the diagnostic signal 45 is set in the high state.

At decision step 145, a determination is made whether load control instructions should be executed. This determination is made based on information produced at the customer location and is not considered to be an important feature of the present invention. If loads are to be shed, internal timers are set and the loads are shed at step 147. After the loads or shed, or if the loads are not to be shed, the microprocessor 41 will proceed to block 157 where a frequency is selected and the signal receiver and conditioner 29 is started. At block 159 the initialization routine ends.

FIg. 6 is a flow chart illustrating the main program loop of the present invention. The main program loop is begun at block 161. The main program loop may alternatively be entered from the end of the initialization loop as shown by block 159. The first step in the main program loop is to decrement a timer reset counter as shown by block 163. The diagnostic signal 45 is then set high as shown by block 164. At decision step 166 a determination is made as to whether an internal clock signal has changed state. If the clock signal has not changed state the microprocessor 41 pauses until the clock signal changes state. When the clock signal has changed state, the microprocessor 41 executes a series of load control commands as shown by block 168. After the load control commands have been executed, the microprocessor 41 executes a series of time keeping commands as shown by block 170. The execution of the load control commands and the time keeping commands as represented by blocks 168 and 170, respectively, represent the bulk of the LMT's functions. The commands included in these blocks are for decrementing individual load timers, producing commands for reconnecting a load to the power distribution network in response to individual load timers, maintaining alternate time bases, and the like.

At step 172 the microprocessor 41 increments the timer reset counter. Decision step 174 determines if the timer reset counter is greater than or equal to twenty-six. If the main program loop has been performed 26 or more times without receiving an interrupt signal, the presumption is that the LMT has malfunctioned and should be reset as illustrated by balloon 133. Under normal conditions the timer reset counter will be less than twenty-six and the microprocessor will set the diagnostic signal 45 low as shown by block 176. After the diagnostic signal has been set low the main program loop ends as shown by block 177. At this point, the main program loop may be executed again in which case the microprocessor 41 will return to step 161.

The discussion of the software flow charts illustrated in FIGS. 5 and 6 are intended for purposes of illustration and not limitation. It is anticipated that alternative embodiments of the present invention may be conceived wherein the location of the instructions for setting the diagnostic signal high and for setting the diagnostic signal low is different from that shown in the discussed flow charts. These alternative embodiments are believed to fall within the spirit and scope of the present invention as claimed hereinafter.

What I claim is:

1. A microprocessor based control logic circuit for producing system control signals and having a reset circuit, said control logic circuit comprising:
   memory means containing a set of preprogrammed instructions;
   a microprocessor connected to said memory means for repeatedly executing said instruction set to produce system control signals, said microprocessor also producing a digital diagnostic output signal operable to a first state in response to a first one of said instructions and operable to a second state in response to a second one of said instructions, said diagnostic output signal being in said first state for a first time period extending from execution of said first instruction until execution of said second instruction and being in said second state for a second time period extending from execution of said second instruction until execution of said first instruction, said microprocessor comprising a reset terminal operative when actuated to cause said microprocessor to enter a reset condition to execute an initialization instruction sequence;
   a first timer connected to said microprocessor and responsive to said first state of said diagnostic output signal, said first timer producing a first reset signal when said first time period exceeds a first predetermined interval, said first reset signal constituting an input to said microprocessor to actuate said reset terminal; and
   a second timer connected to said microprocessor and responsive to said second state of said diagnostic output signal, said second timer producing a second reset signal when said second time period exceeds a second predetermined interval, said second reset signal constituting an input to said microprocessor to activate said reset terminal, said first and second timers comprising the reset circuit.

2. The control logic means of claim 1, wherein the preprogrammed instructions include instructions for a normal operating routine, and wherein the first instruction of said normal operating routine is to set the diagnostic signal in the second state, and wherein the last instruction of said normal operating routine is to set said diagnostic signal in the first state.

3. The control logic means of claim 1 including a power supply providing supply voltages to said control logic means, and including a power failure detection circuit producing a third reset signal for holding the microprocessor in the reset condition in response to said supply voltages being out of regulation.

4. The control logic means of claim 3 wherein the memory means includes read/write memory means requiring protection, and wherein the microprocessor includes an interrupt request input terminal receiving the first, second and third reset signals, said microprocessor performing an interrupt subroutine for protecting said read/write memory means in response to said first, second and third reset signals, and including a reset timer receiving and delaying said first, second and third reset signals such that said interrupt subroutine is completed before said reset terminal is actuated.

5. The control logic means of claim 4 wherein the reset timer includes an inverter receiving the first, second and third reset signals, a first capacitor connected to the output of said inverter for providing the delay of said first, second and third reset signals, a first Schmitt trigger responsive to said first capacitor, a second capacitor responsive to said Schmitt trigger for providing a delay during a power-up, and a third inverter responsive to said second capacitor.

6. The control logic means of claim 1 including means for inhibiting both the first and second timers while the reset terminal is actuated.

7. The control logic means of claim 1 wherein the first timer includes an inverter responsive to the diagnostic signal, a capacitor responsive to said inverter for timing out the predetermined time period and a Schmitt trigger producing the first reset signal in response to said capacitor.

8. The control logic means of claim 1 wherein the second timer includes a capacitor responsive to the diagnostic signal for timing out the predetermined time period and a Schmitt trigger producing the second reset signal in response to said capacitor.

9. A microprocessor based load management terminal having a reset circuit, said load management terminal being a component in a power distribution system for delivering electrical power and carrying information, said load management terminal comprising:

a power line coupling unit connecting said load management terminal to the power distribution system;

a signal receiver and conditioning unit having an input connected to said power line coupling unit and producing a command signal in response to said power line coupling unit;

memory means containing preprogrammed data and instructions;

a microprocessor connected to said signal receiver and coupling unit and to said memory means, said microprocessor performing load management functions in response to said command signal and producing a digital diagnostic output signal operable to a first state in response to one of said instructions and operable to a second state in response to another of said instructions, said microprocessor comprising a reset terminal operative when actuated to cause said microprocessor to enter a reset condition to execute an initialization sequence;

a first timer connected to said microprocessor and responsive to said first state of said diagnostic output signal, said first timer producing a first reset signal when the time during which said diagnostic output signal is in said first state exceeds a first predetermined time period, said first reset signal actuating said reset terminal; and a second timer connected to said microprocessor and responsive to said second state of said diagnostic signal, said second timer producing a second reset signal when the time during which said diagnostic output signal is in said second state exceeds a second predetermined time period, said second reset signal actuating said reset terminal such that said first and second timers comprising the reset circuit.

10. The load management terminal of claim 9 including a power supply providing supply voltages to said load management terminal, and including a power failure detection circuit producing a third reset signal for holding the microprocessor in the reset condition in response to said supply voltages being out of regulation.

11. The load management terminal of claim 10 wherein the memory means includes read/write memory means requiring protection, and wherein the microprocessor includes an interrupt request input terminal receiving the first, second and third reset signals, said microprocessor performing an interrupt subroutine for protecting said read/write memory means in response to said first, second and third reset signals, and including a reset timer receiving and delaying said first, second and third reset signals such that said interrupt subroutine is completed before said reset terminal is actuated.

* * * * *